May 26, 1964

A. R. NORDEN 3,134,871

AIR CIRCUIT BREAKER

Filed Feb. 23, 1960

INVENTOR
*Alexander R. Norden*

BY
*Paul S. Martin*
ATTORNEY

United States Patent Office 3,134,871
Patented May 26, 1964

3,134,871
AIR CIRCUIT BREAKER
Alexander R. Norden, New York, N.Y., assignor to
Federal Pacific Electric Company, a corporation of
Delaware
Filed Feb. 23, 1960, Ser. No. 10,399
11 Claims. (Cl. 200—88)

The present invention relates to circuit breakers of the so-called molded-case air-break type.

An object of the present invention is to provide a circuit breaker of novel construction in which current-interruption in a molded-case air circuit breaker is greatly enhanced and, more particularly, in which the short-circuit interrupting capacity of the circuit breaker is greatly increased compared with the interrupting capacity of previous circuit breakers of like proportions. In another aspect, an object of this invention resides in providing novel structure having increased capacity to interrupt short-circuit currents at higher voltages than those previously used in a standardized class of circuit breakers of established external size and proportions.

A related object resides in the provision of a novel circuit breaker of increased normal operating current rating, having thermal and magnetic tripping means, particularly adapted to provide rapid opening operation of the circuit breaker and current interruption in the event of short-circuit conditions, so as to protect the bimetal. Additional objects of the invention relate to the provision of a new and improved circuit breaker of the molded-case air-break type having improved operating characteristics.

As will be seen from the detailed description below and from the accompanying drawings, the illustrative embodiment of the invention comprises a number of novel features contributing to its successful operation at much higher voltage and higher rated current at such higher voltage than has been feasible heretofore in comparable circuit breakers. The illustrative single-pole circuit breaker which is disclosed is actually one of three poles in a practical form of circuit breaker rated at 100 amperes (thermal tripping level) for a three-phase 240 volt alternating current line, each pole being required to interrupt 5,000 amperes at the 240 volt potential of the three-phase line. Examples of the disclosed circuit breakers have demonstrated far greater interrupting capacity, as will be seen, which is useful for electrical systems having higher standard voltage than 240 volts.

The illustrative circuit breaker includes both thermal and magnetic tripping arrangements contributing to fast automatic opening of the circuit breaker in response to short-circuit currents so as to protect the bimetal against overheating and permanent damage.

The interruption of the short-circuit current is effected quickly, so squickly as to protect the bimetal against overheating and resulting damage during the arcing time. The interruption of the current through the circuit breaker is effected by dual pairs of contacts which are in series electrically and mechanically; and each contact pair has its own arcing chamber and its own vent to the exterior of the molded-case enclosure. The intermediate contact element includes a member formed of copper for high thermal conductivity and high thermal capacity, for preventing excessive temperature rise of this contact element when the circuit breaker is subjected to sustained high current (within its rating) for a prolonged time interval. This intermediate contact forms a barrier that isolates the two arcing chambers from each other so that residual ionized gas (which might cause restriking in one of the arcing chambers) does not reach the other arcing chamber.

The center contact member extends as a lever to a region outside the arcing chambers; and the molded enclosure provides a pocket receiving a biasing spring for urging the intermediate contact into its seated and sealed position separating the two arc chambers.

The arcing chamber identified with the moving contact element communicates through a vent to the exterior of the circuit breaker; but it also communicates to a chamber in the circuit breaker enclosure that contains the circuit breaker operating mechanism. For this reason, the gas pressure in the arcing chamber at the moving-contact side of the intermediate contact tends to be lower than the gas pressure in the chamber at the other side of the intermediate contact member. The latter chamber communicates to the exterior almost exclusively by its venting passage. This higher gas pressure thus augments the spring bias that urges the intermediate contact member to its seated or sealed position.

Further features of the invention relate to the contact relationships and motions which contribute to firm contact pressure without undue operating burden required of the manual operating mechanism; rocking and wiping contact action which, with high spring contact pressure, tends to prevent or break "stick" welds and to maintain low contact resistance and low operating temperatures of the contacts.

The foregoing objects, features and advantages will be better appreciated from the following detailed description of the illustrative embodiment shown in the accompanying drawings, from which further objects and features will become apparent.

Figure 1:
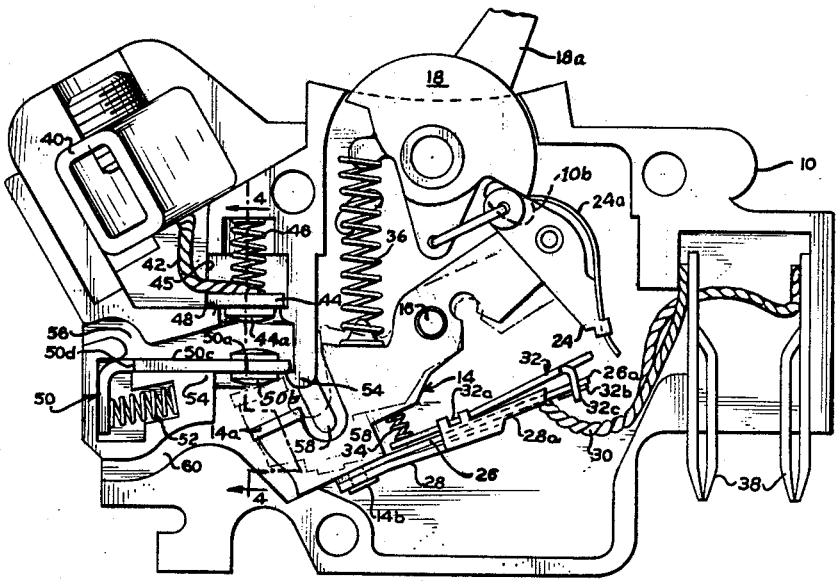
FIG. 1 is an enlarged side view of an illustrative circuit breaker embodying the various novel features of the invention. The circuit breaker is shown with the cover removed to reveal the internal parts, certain of the parts appearing both in solid lines and in broken lines to represent the "open" position and an intermediate operative position of the mechanism, respectively.

The circuit breaker illustrated in the drawings is a single-pole circuit breaker, drawn to enlarged scale, this being one pole of a three-pole circuit breaker of compact proportions.

Figure 3:
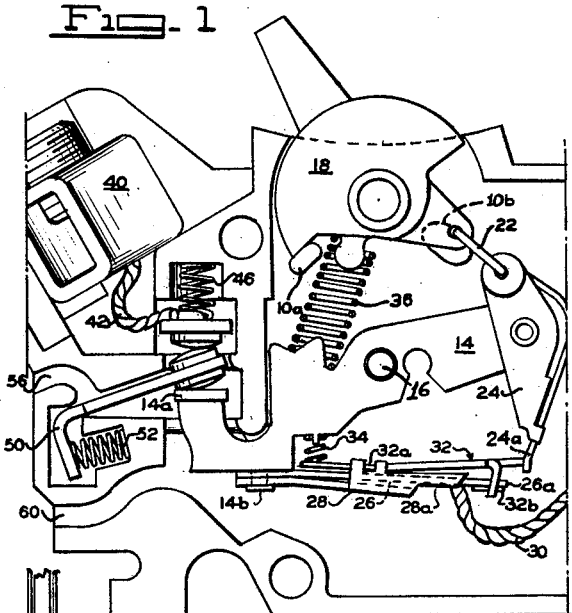
FIG. 3 is an enlarged fragmentary view corresponding to FIG. 1 with the mechanism in its fully closed configuration.
Figure 4:
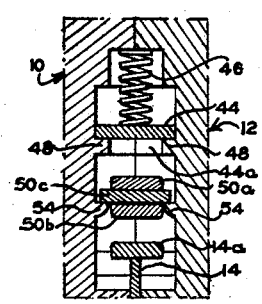
FIG. 4 is a vertical cross-section along the line 4—4 in FIG. 1.
Figure 5:
FIG. 5 is a fragmentary elevation showing the latching assembly as viewed from the right in FIG. 3.

The circuit breaker shown includes an enclosure of molded insulation including case 10 (FIGS. 1 to 4) and a complementary cover 12 (FIG. 4). Between case 10 and cover 12 there is a contact arm 14 as of copper that is carried on a rigid pivot 16 supported by enclosure parts 10 and 12. Handle 18 is pivoted between the case 10 and cover 12. A U-shaped rigid link 22 formed of bent wire is pivoted in an extension of handle 18. The other leg of U-shape link 22 is pivoted to an actuator 24 which, in turn, has an insulated pivot to contact arm 14, and actuator 24 includes an ambient temperature compensating bimetal 24a which constitutes its latched end. Current responsive bimetal 26 is united at one end to contact arm 14, providing connection and a rigid mechanical connection at this point. Contact arm 14 constitutes a conductive support that carries and unites bimetal 26 and magnetic pole structure 28. The magnetic pole structure 28 of a tripping electromagnet is also united to bimetal 26 and to contact arm 14, rivet 14b extending integrally through the bimetal and the pole structures from contact arm 14. Pole structure 28 is of greater width than the bimetal and extends all the way across the bimetal except for a cut-out 28a to accommodate parallel conductors 30 of flexible conductive braid that are united to bimetal 26 near its right-hand end as viewed in the drawings. A magnetic armature 32 on the side of bimetal 26 opposite from pole structure 28 has lateral pivots 32a resting in notches in the pole structure as shown. Armature 32 is wider than bimetal 26 at the right of pivot 32a and extends into latching engagement (FIG. 3) with actuator 24. To the left of pivot 32a, armature 32 is of short, slender proportions.

A wire compression spring 34 biases the armature counterclockwise, acting directly against armature 32 and contact arm 14. This armature is attracted toward pole structure 28 by the field of the current through bimetal 26. When the magnetic attraction overcomes the latch friction and the relatively weak spring bias, tripping occurs. The magnetic elements are proportioned so that attraction will be strong enough for tripping deflection only in response to fault currents of about ten times the thermal current rating of the circuit breaker.

By virtue of the form and proportions of the core 28 as shown, armature 32 is spaced away from the upper face of the bimetal throughout the range of motion of both the bimetal and the armature. However, bimetal 26 has a narrow end projection 26a which, acting through insulating lever 32b, applies downward pressure to the hooked portion 32c of the armature. Bimetal 26 is arranged to curve downward when heated. When an overcurrent of sufficiently high level and for a sufficient period of time occurs, bimetal deflection releases actuator 24.

A compression spring 36 is interposed between respective projections on contact arm 14 and handle 18, basing both the contact arm and the handle to their "open" position when the circuit breaker is open. As shown in FIG. 3, this compression spring provides strong contact-opening bias when the circuit breaker is closed. In the closed configuration of the mechanism shown in FIG. 3, actuator 24 is latched by armature 32, and the counterclockwise spring bias applied to contact arm 14 is resisted by an over-set toggle consisting of link 22 and pivoted handle 18. Counterclockwise motion of handle 18 is limited by an integral stop 10a projecting from case 10. In this configuration, spring 36 still provides a limited bias for operating handle 18 in the contact-opening direction; and the toggle comprising handle 18 and link 22 lock the contact arm closed, under control of armature or latch 32. Upon downward deflection of the armature magnetically or by pressure from current-responsive bimetal 26, contact arm 14 is driven counterclockwise by spring 36 (and springs 46 and 52 to be described), actuator 24 swinging clockwise at this time.

Two parallel pieces of flexible copper braid 30 extend from bimetal 26 to respective plug-in terminals 38, which are to make connection to correspondingly slotted plug-in panelboard terminals.

At the end of the circuit breaker remote from plug-in terminals 38 is a solderless connector 40 constituting the opposite terminal of the illustrated single-pole circuit breaker. Flexible-braid connections 42 extend from this terminal to a so-called stationary contact element 44. Compression spring 46 provides downward bias against contact element 44, downward travel of this contact element being limited (when the circuit breaker is opened) by molded shoulders 48 of enclosure 10, 12. Silver tungsten contact 44a of contact element 44 thus projects through a passage which is closed off by contact element 44 both when the circuit breaker is open and when the circuit breaker is in the initial phase of parting of the contacts (FIG. 2) during opening of the circuit breaker.

An intermediate contact member 50 is of L-shaped configuration and is biased clockwise about shoulder 50d (cooperating with corresponding casing formations) by compression spring 52. Clockwise travel of contact element 50 is limited by shoulder portions 54 of the enclosure parts 10 nad 12, as illustrated in FIG. 1. Silver-tungsten contacts 50a and 50b are suitably united to copper contact carrier 50c. In its open condition, contact carrier 50c rests against shoulder 54 which defines a passage surrounding the downward projecting contact 50b. Contact element 50 thus forms a valve or seal across the bottom of the arcing space between contact element 50a and companion contact 44a. This arcing space or chamber is vented to the exterior by passage 56. Copper contact carrier 50c has substantial thermal capacity to protect contacts 50a and 50b during arcing conditions.

Contact element 14a, which is united to the moving contact arm 14, cooperates with the contact 50b in closed condition of the circuit breaker. A second arcing chamber is provided by the casing 10—12 between contacts 14a and 50b. The casing walls provide ribs 58 between which contact arm 14 moves. The lower companion pair of contacts 14a and 50b make and break contact in the lower arc chamber which has a venting passage 60 to the exterior.

The operation of the mechanism and the companion pairs of contacts in their respective arcing chambers may now be described. In order to close the circuit breaker, handle 18 is operated from its "open" position as in FIG. 1 to its "closed" position as in FIG. 3, then being locked closed by toggle 18, 22 subject to overload-release by bimetal 26 or armature 32. In moving from its open position, handle 18 drives link 22 to force actuator 24 initially into latching engagement with armature 32. Continued handle movement drives actuator 24 and latching assembly 26, 32 as a unit with contact arm 14 clockwise about pivot 16 until toggle 19, 22 is locked in over-set position and spring 36 is compressed. Handle 18a is arrested by casing stop 10a.

Figure 2:
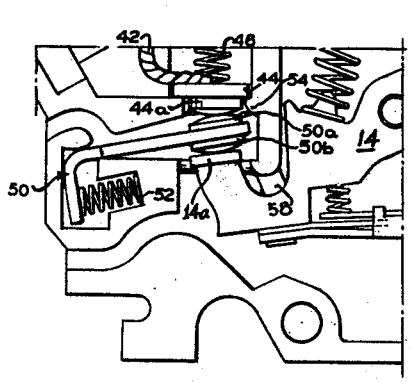
FIG. 2 is a fragmentary view of the embodiment of FIG. 1 showing the contacts in their position assumed at the instant that a circuit through the circuit breaker is completed during a closing operation. This is also the position assumed when parting of the contacts commences during an opening operation.

In FIG. 1 contact arm 14 is shown in its open position as represented in solid lines; and the contact arm is also represented in broken lines when contact 14a first engages contact 50b in the closing operation. These contacts have relatively slanting surfaces at their moment of engagement. As the contact-closing operation proceeds, there is rocking and wiping engagement between contacts 14a and 50b. FIG. 2 illustrates the contacts in their configuration that exists when contact 50a first touches contact 44a. The wiping and rocking action of contacts 14a and 50b continues until the mechanism reaches its fully closed position, as represented in FIG. 3. This wiping and rocking engagement is of importance inasmuch as it tends to smooth out any tiny projections that might develop during arcing conditions when the contacts open and break the circuit, and it tends also to break "stick" welds that might occur. Notably contact arm 14 swings through an arc about its pivot 16 to the right of the point of contact engagement while intermediate contact element 50 swings through a counterclockwise arc about fulcrum 50d to the left of the point of contact engagement. These reverse-arc motions contribute to highly desirable mechanism of contact engagement and of contact parting.

Contact element 50 is operated counterclockwise by drive from moving contact arm 14; and initial engagement of contact 50a with stationary contact 44a is established in the manner illustrated in FIG. 2. Continued counterclockwise travel of intermediate contact element 50 is accompanied by a wiping of contact 50a against contact 44a. This occurs as contact element 44 rises, being constrained against lateral shift by the guide formations 45 in the casing above shoulders 48. Upward arcuate drive of contact element 50 causes wiping between contacts 44a and 50a. Spring 46 biases contact 44a into firm pressure engagement against the intermediate contact element 50.

The contact pressures which exist when the circuit breaker is closed and while it is either closing or opening, involve a relatively heavy pressure engagement between contact elements 44a and 50a; and this contact pressure is increased by the force of compression spring 52, so that even greater contact pressure thus exists between contacts 14a and 50b.

In the event that the circuit breaker is manually opened or is tripped open automatically in response to an overload, the initial parting of contacts 44a and 50a commences arcing conditions which promote pressure seating of contact element 50 against shoulder 54. Spring 52 insures seating of this element, and sealing against shoulder 54. Venting of the upper arc chamber is wholly confined to vent passage 56 with no possibility of the hot gasses or the arc itself reaching any chamber containing the operating mechanism or spring 52. Continued but extremely fast opening motion of the mechanism involves the striking of a second arc, between contacts 50b and 14a. The arcing that develops at this time has some tendency of driving hot gasses into the mechanism chamber to the right of the projections 58 extending from the casing walls but which are spaced apart sufficiently for guiding moving contact arm 14. However, because of the angular relationship between the two contacts 14a and 50b the arc tends to form a loop which rapidly expands away from the circuit breaker mechanism and into the vent passage 60.

Examination of the contact surfaces of a circuit breaker of the form described, after repeated severe current interruptions, revealed contact erosion in the plane of contact arm 14 and a short distance to both sides of that plane, but at the front and back edges (spaced from said plane) there are shiny areas for making low-resistance contact. It has been found that, because of the contact action detailed above and the high contact pressures attainable, very low voltage drop is incurred and very modest contact temperature rise develops.

The construction described involves two sets of contact pairs in series electrically and mechanically. The extinction of the arc between either pair of contacts interrupts the current. This result is promoted by intermediate contact member 50 which seals off each arcing chamber from the other so as to prevent ions that may remain in either chamber from causing re-striking of the arc in the other chamber. It has been found that greatly enhanced interruption properties are realized despite the fact that the operating stroke of the moving contact in a practical example of the circuit breaker described is substantially the same as the operating stroke of a like circuit breaker with a single pair of contacts. Indeed, the two sets of contacts, working in the confined arcing chambers formed by the walls of the enclosure (advantageously urea formaldehyde with a filler) have demonstrated performance considerably superior to a like single-break commercial circuit breaker with equal stroke of the moving contact arm, even with an arc-chute having spaced ferrous arc-splitting plates supported in a fibre wall. In a practical example of the illustrated circuit breaker rated at 100 amperes, the dual in-line contact pairs 44a, 50a and 50b, 14a have been demonstrated capable of meeting the interruption rating requirement in three-phase breakers of 5,000 amperes at 240 volts alternating current, and, indeed, this circuit breaker has actually interrupted 5,000 amperes at 420 volts alternating current. This interruption capacity may be compared with a previous maximum of about 4,000 amperes let-through current at 240 volts with single-break construction having like enclosure dimensions and like operating stroke of the moving contact arm.

The contact pairs being in series mechanically is significant in that the effort involved in normal closing operation of the breaker is converted into contact pressure and is not divided in half as in arrangements involving bridging double-break contacts. High contact pressure is important for firm wiping action at the contact faces, and for minimized contact resistance and minimized heating in the closed condition of the contacts when carrying rated current for a prolonged time interval. The high contact pressure is attained without requiring undue manual effort in closing the circuit breaker, even when three poles are included and coordinated as shown in my patent No. 2,923,788, issued February 2, 1960.

In the event of a short-circuit, a large part of the line voltage appears instantaneously as a voltage drop between the two ends of the bimetal, since the bimetal represents most of the resistance of the circuit breaker. Insulator 32b provides needed electrical separation between armature 32 and the right-hand extremity of bimetal 26. Spring 34 which biases armature 32 in the normal latching direction (counterclockwise in the drawing) applies pressure between a part of armature 32 and a part of contact arm 14. These parts are both at the same potential even during short-circuit conditions. In the illustrated construction, it is safe to use an ordinary wire compression spring 34 for biasing armature 32 to its latching position; and complications involved in other arrangements are avoided, where a comparable spring might act against two elements at greatly different operating potentials under short-circuit conditions. Further, the armature 32 is retained in the assembly as shown by spring 34 after laterally extending pivots 32a of the armature are received in complementary notches in core 28 and armature portion 32c is hooked under bimetal portion 26a.

The foregoing illustrative embodiment represents an exemplary circuit breaker having a number of features of novelty contributing to its excellence. However, it will be readily apparent that various modifications and varied application of the several novel features will be suggested by this description to those skilled in the art, and consequently the invention should be construed broadly, consistent with its full spirit and scope.

Having thus described my invention, what I claim and desire to secure by Letters Patent is:

1. A circuit breaker having an enclosure of molded insulation, a relatively stationary contact element, a movable contact element, spring means biasing said relatively stationary element towards said movable contact element, said enclosure having a formation providing a passage with a contact-surrounding shoulder against which said relatively stationary contact element is seated and sealed when the circuit breaker is open, an additional contact element movably interposed between the aforementioned contact elements so as to constitute two contact pairs in series electrically and mechanically, said enclosure having a further formation providing a further passage between said movable contact element and said additional contact element and providing a further contact-surrounding shoulder, resilient means for biasing said additional contact element toward said movable contact element, so that said additional contact element is seated and sealed against said further shoulder when the circuit breaker is open, and circuit breaker operating mechanism including a positive-acting linkage for driving said movable contact element against said additional contact element and thereafter for driving said movable contact element together with said additional contact element against said resiliently mounted contact element.

2. A circuit breaker having an enclosure of molded insulation, a relatively stationary contact element, a movable contact element, spring means biasing said relatively stationary element toward said movable contact element, said enclosure having a formation providing a passage with a contact-surrounding shoulder against which said relatively stationary contact element is seated and sealed when the circuit breaker is open, an additional contact element movably interposed between the aforementioned contact elements so as to constitute two contact pairs in series electrically and mechanically, said enclosure having a further formation providing a further passage between said movable contact element and said additional contact element and providing a further contact-surrounding shoulder, resilient means for biasing said additional contact element toward said movable contact element so that said additional contact element is seated and sealed against said further shoulder when the circuit breaker is open, separate vents to the exterior of said enclosure extending from said passages, respectively, and circuit breaker operating mechanism including a positive-acting linkage for driving said movable contact element against said additional contact element and thereafter for driving said movable contact element together with said additional contact element against said resiliently mounted contact element.

3. A circuit breaker having an enclosure of molded insulation, circuit breaker operating mechanism in said enclosure and having an external operating handle, a relatively stationary contact element, a movable contact element forming part of said operating mechanism, and an additional movable contact element interposed between the aforementioned contact elements so as to constitute two contact pairs in series mechanically and electrically, said enclosure providing respective vents extending from arcing spaces between said contact pairs to the exterior of the enclosure, said casing being of a formation to isolate the arcing space between said relatively stationary contact element and said additional contact element from the other of said arcing spaces.

4. A circuit breaker having an enclosure of molded insulation, circuit breaker operating mechanism in said enclosure and having an external operating handle, a relatively stationary contact element, a movable contact element forming part of said operating mechanism, and an additional movable contact element interposed between the aforementioned contact elements so as to constitute two contact pairs in series mechanically and electrically, said enclosure providing respective vents extending from arcing spaces between said contact pairs to the exterior of the enclosure, said enclosure being formed to provide an operating mechanism chamber substantially blocked off from the arcing space between said relatively stationary contact element and said additional contact element.

5. A circuit breaker having an enclosure of molded insulation, a relatively stationary contact element, circuit-breaker operating mechanism in said enclosure having a pivoted externally projecting handle, said mechanism including a pivoted contact element, and an additional movable contact element interposed between the aforementioned contact elements so as to constitute two contact pairs in series, mechanically and electrically, said additional contact element having a pivotal mounting at the side of the contact pairs remote from the pivot of said pivoted contact element.

6. In combination, a circuit breaker having a resiliently mounted laterally restrained contact element, a movable contact element, operating mechanism having a positive-acting linkage for driving said movable contact element toward said resiliently mounting contact element, and an additional movable contact element interposed between the aforementioned contact elements so as to constitute two contact pairs in series electrically and mechanically, said first mentioned movable contact element and said additional contact element having respective pivotal mountings at opposite sides of said contact pairs.

7. A circuit breaker having an enclosure of molded insulation, a resiliently mounted contact element, a movable contact element, circuit breaker operating mechanism including a positive-acting linkage for driving said movable element toward said resiliently mounted contact element, and an additional contact element movably interposed between the aforementioned contacts so as to constitute two contact pairs in series electrically and mechanically, said additional contact element having a support of substantial heat capacity and high thermal conductivity, said support having a pivot between the ends thereof and having contact end portion and a spring acting on the support at the side of the pivot opposite to said contact end portion, separate venting passages extending to the enclosure exterior from respective arcing spaces between said contact pairs, said enclosure including a chamber containing said spring between said venting passages.

8. A circuit breaker including an enclosure of molded insulation, a pivoted contact arm therein having a movable contact element, overcurrent release means carried by said contact arm, a pivoted actuator carried by said contact arm and normally latched by said overload release means when the circuit breaker is closed and operable for tripping said actuator in response to an overload, a manually operable toggle mechanism connected to said actuator for driving the contact arm closed and locking it closed, a companion movable contact element engageable by said movable contact element and operable by said contact arm in the closing operation of said toggle mechanism, and a third contact element engageable by said companion movable contact element, said enclosure having formations establishing separate arcing chambers about the engageable contact elements respectively, only one of said arcing chambers having a passage communicating to the portions of the enclosure containing said actuator, said toggle and said overcurrent release means, and said passage affording restricted operating space for said pivoted contact arm.

9. A circuit breaker including an enclosure of molded insulation, a pivoted contact arm therein, an overcurrent release means carried by said contact arm, an actuator pivoted to said contact arm and latched by said overcurrent release means and operable for tripping said actuator upon occurrence of an overload, manually operable toggle mechanism connected to said actuator for driving and locking the contact arm closed, and a companion contact element engageable by said movable contact element of said contact arm in the closed condition of the circuit breaker, said overload release mechanism including a current-responsive bimetal and a magnetic core element joined to said contact arm at the side of the bimetal remote from the contact arm, a magnetic armature pivoted to said core element and disposed between said bimetal and said contact arm and operable into and out of latching engagement with said actuator and a wire compression spring engaging respective portions of said contact arm and said armature for biasing the armature in the direction to latch said actuator, said armature having an insulated operative connection to the active end of the bimetal for operation thereby in the unlatching direction.

10. A circuit breaker including an enclosure of molded insulation, a pivoted contact arm therein, an overcurrent release means carried by said contact arm, an actuator pivoted to said contact arm and latched by said overcurrent release means and operable for tripping said actuator upon occurrence of an overload, manually operable toggle mechanism connected to said actuator for driving and locking the contact arm closed, and a companion contact element engageable by said contact arm in the closed condition of the circuit breaker, said overload release mechanism including a current-responsive bimetal and a magnetic core element joined to said contact arm on the side of said bimetal remote from said contact arm, a magnetic armature pivoted to said core element and disposed between said bimetal and said contact arm and on the side of the bimetal opposite said core and operable into and out of latching engagement with said actuator and a wire compression spring engaging respective portions of said contact arm and said armature for biasing the armature in the direction to latch said actuator, said armature having an insulated operative connection to the active end of the bimetal for operation thereby in the unlatching direction, said core element being of channel-shaped cross-section extending along and partly about said bimetal and said armature being arranged as a latch normally obstructing said actuator and carried by the core element at the opposite side of the bimetal and spaced from the confronting side thereof in all operative positions of the bimetal and the armature.

11. A circuit breaker including a pair of separable contacts, operating mechanism therefor and overload release means for causing automatic contact-opening operation of said contacts in response to fault current, the last-named means including a current responsive bimetal, a conductive support fixed to one end of said bimetal, a core structure fixed to said conductive support and disposed at the side of said bimetal opposite said conductive support, an armature pivoted to said core structure and disposed between said bimetal and said conductive support on the side of the bimetal opposite said core structure, a releasable member latched by said armature, and a wire spring biasing the latch end of said armature in its latching direction and away from said core structure, said wire spring being disposed to act against said conductive support and said armature.

References Cited in the file of this patent

UNITED STATES PATENTS

| | | |
|---|---|---|
| 1,955,216 | Whitney et al. | Apr. 17, 1934 |
| 2,420,889 | Leeds | May 20, 1947 |
| 2,498,039 | Gunn | Feb. 21, 1950 |
| 2,847,533 | Christensen | Aug. 12, 1958 |
| 2,889,428 | Kingdon et al. | June 2, 1959 |
| 2,921,169 | Judd et al. | Jan. 12, 1960 |
| 2,934,620 | Middendorf | Apr. 26, 1960 |
| 3,038,980 | Lee | June 12, 1962 |

FOREIGN PATENTS

| | | |
|---|---|---|
| 102,638 | Australia | Nov. 29, 1937 |